(12) United States Patent
Lim

(10) Patent No.: US 9,876,205 B2
(45) Date of Patent: Jan. 23, 2018

(54) BATTERY MODULE

(71) Applicant: SAMSUNG SDI CO., LTD., Yongin-si, Gyeonggi-do (KR)

(72) Inventor: Young-Bin Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 143 days.

(21) Appl. No.: 14/606,878

(22) Filed: Jan. 27, 2015

(65) Prior Publication Data

US 2015/0214525 A1    Jul. 30, 2015

(30) Foreign Application Priority Data

Jan. 29, 2014   (KR) .................. 10-2014-0011005

(51) Int. Cl.
*H01M 2/12* (2006.01)
*H01M 2/10* (2006.01)
*H01M 10/04* (2006.01)
*H01M 10/052* (2010.01)

(52) U.S. Cl.
CPC ........... *H01M 2/12* (2013.01); *H01M 2/1077* (2013.01); *H01M 10/0413* (2013.01); *H01M 10/0481* (2013.01); *H01M 10/052* (2013.01); *H01M 2220/20* (2013.01); *Y02E 60/122* (2013.01); *Y02P 70/54* (2015.11)

(58) Field of Classification Search
CPC .. H01M 2/12; H01M 2/1077; H01M 10/0413; H01M 10/0481; H01M 10/052; H01M 2220/20; Y02T 10/7011
See application file for complete search history.

(56) References Cited

U.S. PATENT DOCUMENTS

2012/0164490 A1\* 6/2012 Itoi ...................... H01M 2/105
429/7

\* cited by examiner

*Primary Examiner* — Raymond Alejandro
(74) *Attorney, Agent, or Firm* — Lewis Roca Rothgerber Christie LLP

(57) ABSTRACT

A battery module includes a plurality of battery cells each having a vent portion located in a first surface thereof, the plurality of battery cells being aligned in a first direction; a plurality of barriers each covering at least a portion of the first surface so that the vent portion is exposed, the barriers being located between adjacent ones of the plurality of battery cells; an insulating member mounted on the first surface, the insulating member having a plurality of first openings each corresponding to a respective one of the vent portions; a cover provided above the insulating member to cover the vent portions and the insulating member; and a pressing member located between the insulating member and the cover, wherein the insulating member includes a first sealing portion protruding toward the cover, and a second sealing portion protruding toward the first surface.

20 Claims, 7 Drawing Sheets

BATTERY MODULE

CROSS-REFERENCE TO RELATED APPLICATION

This application claims priority to and the benefit of Korean Patent Application No. 10-2014-0011005, filed on Jan. 29, 2014, in the Korean Intellectual Property Office, the entire contents of which are incorporated herein by reference.

BACKGROUND

1. Field

Aspects of the present invention relate to a battery module.

2. Description of the Related Art

A high-power battery module using a non-aqueous electrolyte with high energy density has recently been developed. The high-power battery module is configured as a large-capacity battery module manufactured by connecting a plurality of battery cells in series to be used in driving motors of devices requiring high power, e.g., electric vehicles and the like. Further, a battery pack can be configured by electrically connecting such a plurality of battery modules to one another.

Generally, a battery module may be configured with a plurality of battery cells, wherein each battery cell transmits energy to an external electronic device through an electrochemical reaction. The plurality of battery cells are fixed by a housing to be used as a single power source. In one embodiment, a material such as lithium having high reactivity is included in the battery cell, and therefore, the safety of the battery cell may be problematic.

SUMMARY

Embodiments provide a battery module having a new structure capable of efficiently collecting gas generated in a battery cell.

According to an aspect of the present invention, there is provided a battery module, including: a plurality of battery cells each configured to have a vent portion formed in a first surface thereof, the plurality of battery cells being aligned in a first direction; barriers each configured to cover at least one portion of the first surface so that the vent portion is exposed, the barriers being located between the plurality of battery cells; an insulating member mounted on the first surface, the insulating member having a plurality of first openings corresponding to the respective vent portions; a cover provided above the insulating member to cover the vent portions and the insulating member; and a pressing member located between the insulating member and the cover, wherein the insulating member includes a first sealing portion protruded toward the cover, and a second sealing portion protruded toward the first surface.

The insulating member may include a base portion mounted on the first surface, and a first opening provided inside the base portion to expose the vent portion therethrough. The first sealing portion may be provided along the outer circumferential portion of the base portion on an upper surface of the base portion, and the second sealing portion may be provided adjacent to the first opening on a lower surface of the base portion.

The first sealing portion may be provided to be continuously extended along the outer circumferential portion of the insulating member, and the second sealing portion may be provided to surround the first opening.

The first sealing portion may be vertically protruded from the base portion, and the second sealing portion may be spaced from the first sealing portion to be vertically protruded from the base portion.

The pressing member may be mounted on the insulating member, and have a second opening corresponding to the first opening.

The pressing member may include a pressing portion configured to have the second opening, the pressing portion being contacted with the insulating member, and a support portion provided at the outer circumferential portion of the pressing portion to be protruded toward the cover.

The pressing member may be mounted on the insulating member to be contacted with the first sealing portion of the insulating member.

The cover may include an accommodating portion configured to accommodate the insulating member and the pressing member therein, and a side portion configured to surround the accommodating portion.

The side portion may be provided to be stepped in the direction toward the first surface.

The side portion may include first and second stepped portions provided to be stepped different from each other, and the sectional area of the first stepped portion in the direction parallel to the first surface may be provided smaller than that of the second stepped portion.

The first and second stepped portions may be sequentially provided, and the second stepped portion may be provided adjacent to the first surface.

The pressing member may include a pressing portion provided on the insulating member, and a support portion protruded toward the cover at the outer circumferential portion of the pressing portion. The support portion may be contacted with the first stepped portion of the cover.

The cover may include an accommodating portion configured to accommodate the insulating member and the pressing member therein, and a side portion configured to surround the accommodating portion to face the first sealing portion of the insulating member and the support portion of the pressing member. The first stepped portion may press the support portion, and the second stepped portion may press the first sealing portion.

The barrier may include an upper flange portion configured to cover the first surface of the battery cell, and a third opening corresponding to the vent portion may be provided in the upper flange portion.

The second sealing portion may be inserted into the third opening to be contacted with a circumferential portion of the vent portion.

The barrier, the insulating member, the pressing member and the cover may be sequentially provided on the first surface of the battery cell, and the barrier, the insulating member and the pressing member may be provided to expose the vent portion therethrough. The first sealing portion of the insulating member may be contacted with the cover, and the second sealing portion of the insulating member may be contacted with the circumferential portion of the vent portion.

The cover may press the first sealing portion of the insulating member, and the second sealing portion may be closely contacted with the vent portion while pressing the circumferential portion of the vent portion.

An end of the first or second sealing portion may be formed with a double projection.

First coupling portions may be provided at an upper portion of the insulating member, and a second coupling portion coupled to the first coupling portion may be provided in the pressing member.

The insulating member may include a plurality of first openings provided to be spaced from each other, and some of the first coupling portions may be provided between adjacent first openings.

As described above, according to the present invention, it is possible to provide a battery module having a new structure.

Further, it is possible to provide a battery module having a structure capable of efficiently collecting gas generated in a battery cell.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
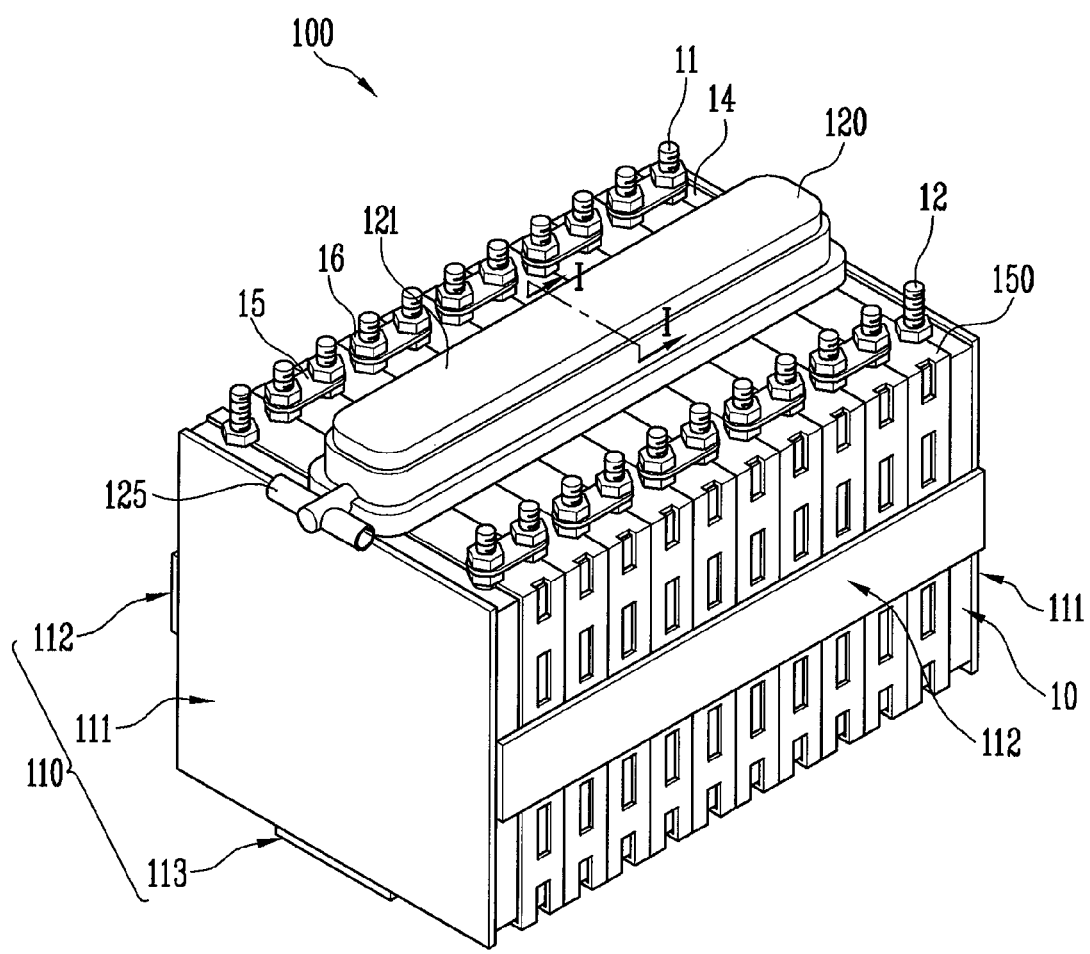
FIG. 1 is a perspective view of a battery module according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the other element or be indirectly on the another element with one or more intervening elements interposed therebetween. Also, when an element is referred to as being "connected to" another element, it can be directly connected to the other element or be indirectly connected to the another element with one or more intervening elements interposed therebetween. Hereinafter, like reference numerals refer to like elements.

Figure 2:
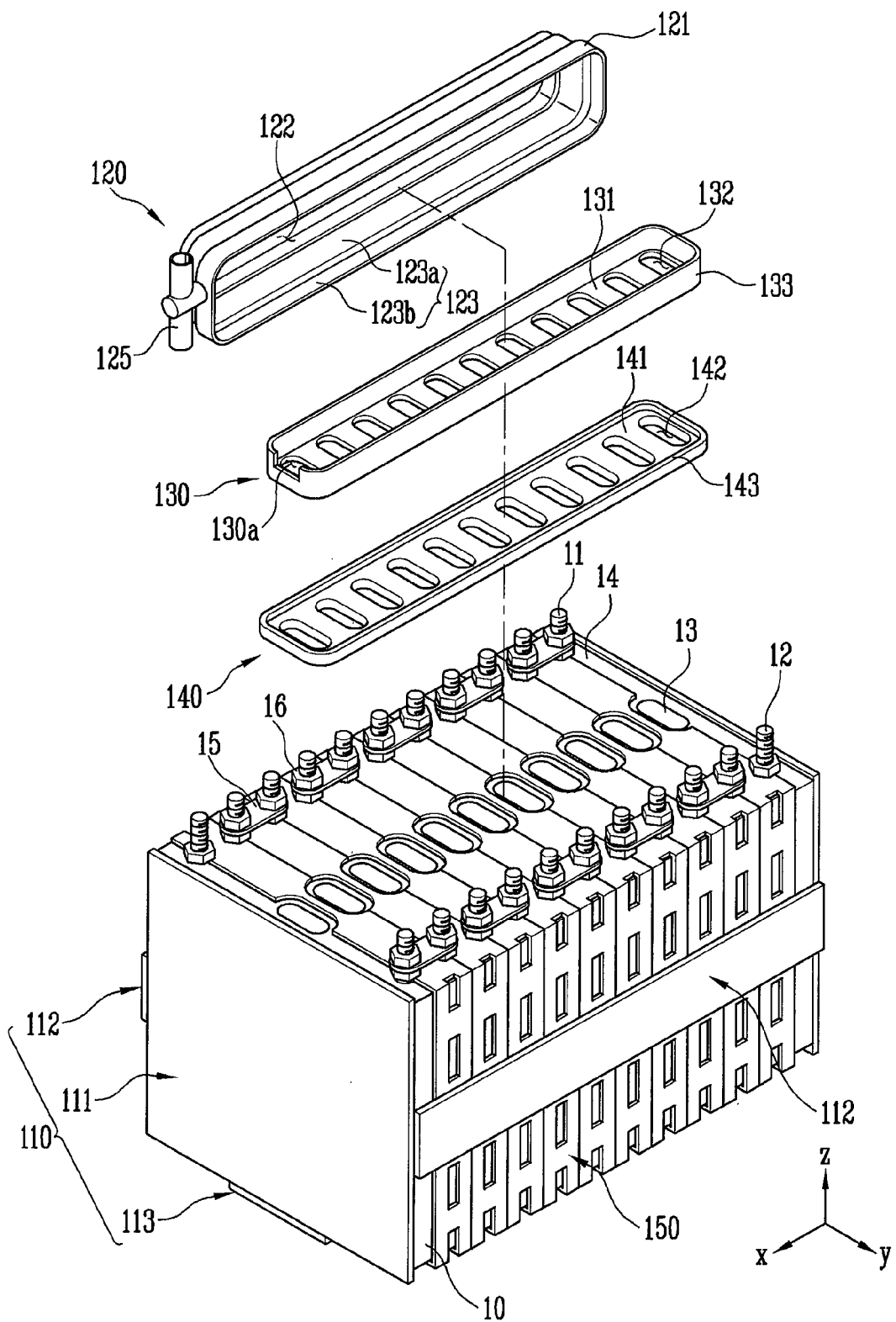
FIG. 2 is a partially exploded perspective view of the battery module of FIG. 1.

FIG. 1 is a perspective view of a battery module according to an embodiment of the present invention. FIG. 2 is an exploded perspective view of the battery module of FIG. 1.

Referring to FIGS. 1 and 2, the battery module 100 according to this embodiment includes a plurality of battery cells 10 each configured to have a vent portion 13 formed in a first surface 14 thereof, the plurality of battery cells 10 being aligned in a first direction (x direction); barriers 150 each configured to cover at least one portion of the first surface 14 so that the vent portion 13 is exposed, the barriers 150 located between the plurality of battery cells 10; an insulating member 140 mounted on the first surface 14, the insulating member 140 having a plurality of first openings 142 corresponding to the respective vent portions 13; a cover 120 provided above a top of the insulating member 140 to cover the vent portions 13 and the insulating member 140; and a pressing member 130 located between the insulating member 140 and the cover 120. The insulating member 140 includes a first sealing portion protruded toward the cover 120, and a second sealing portion 144 (see FIG. 4B) protruded toward the first surface 14.

The battery cell 10 may be provided with a plurality of battery cells aligned in the first direction (x direction) so that wide surfaces of the battery cells 10 face each other. The battery cell 10 may be manufactured by accommodating an electrode assembly and an electrolyte in a battery case and then sealing the battery case with the first surface 14 including, for example, a cap assembly and the like. The first surface 14 may be provided with a positive electrode terminal 11, a negative electrode terminal 12 and the vent portion 13. The electrode assembly is electrically connected to the positive and negative electrode terminals 11 and 12, and the positive and negative electrode terminals 11 and 12 become a passage through which energy generated by an electrochemical reaction between the electrode assembly and the electrolyte is transferred. A gas is generated inside the battery cell 10 due to a side reaction of the electrochemical reaction. In one embodiment, the vent portion 13 acts as a passage through which the gas generated inside the battery cell 10 is exhausted to an outside.

The positive or negative electrode terminals 11 or 12 of two battery cells 10 adjacent to each other may be electrically connected by a bus-bar 15. The bus-bar 15 has openings through which the positive and negative electrode terminals can pass, and the bus-bar 15 connected to the positive and negative electrode terminals 11 and 12 passing through the holes may be fixed by a nut 16 or the like.

A housing 110 fastens and fixes together the plurality of battery cells 10 and the barriers 150 located between the battery cells 10, and the plurality of battery cells 10 may act as a single power source. The housing 110 may include a pair of end plates 111 each located facing respective wide surfaces of outermost battery cells 10, and connecting members 112 and 113 configured to connect the end plates 111. The connecting members 112 and 113 may be provided to support lower and side surfaces of the battery cell 10.

A portion of the barrier 150, the insulating member 140, the pressing member 130 and the cover 120 may be sequentially provided on the first surface 14 of the battery cell 10.

The barrier 150, the insulating member 140, and the pressing member 130 may be provided to expose the vent portion 13 therethrough. In one embodiment, the first sealing portion 143 of the insulating member 140 may contact the cover 120, and the second sealing portion 144 (see FIG. 4B) may contact the vent portion 13.

The cover 120 may be formed in the shape of a box having an opened surface at one side thereof. The cover 120 may include an accommodating portion 122 configured to accommodate the insulating member 140 and the pressing member 130 therein, and a side portion 121 configured to surround the accommodating portion 122. The side portion 121 may be formed to be stepped in a direction (z direction) toward the first surface 14. The cover 120 may be mounted on the first surface 14 of the battery cell 10 so that the opened surface of the cover 120 faces the vent portion 13. Accordingly, the internal space of the cover 120 can form a flow path through which the gas exhausted through the vent portion 13 can move.

A gas exhaust port 125 connected to the internal flow path may be formed at one side of the side portion 121. The gas exhaust port 125 may be connected to a pipe or the like having a passage. The gas exhaust port 125 may act as a passage through which the gas exhausted inside the battery cell 10 is exhausted to the outside of the battery cell 10. The gas exhaust port 125 may be formed in a T shape so that the left and right sides of the gas exhaust port 125 are opened, but the present invention is not limited thereto.

The side portion 121 may be formed to have a step difference 123 in the direction toward the first surface 14. The side portion 121 includes first and second stepped portions 123a and 123b provided to be stepped different from each other. The sectional area of the first stepped portion 123a in the direction parallel to the first surface 14 may be formed smaller than that of the second stepped portion 123b. For example, the first and second stepped portions 123a and 123b may be sequentially provided. In one embodiment, the second stepped portion 123b may be formed adjacent to the first surface 14. In other words, the side portion 121 may be formed not to be planar but to be stepped. When a portion formed adjacent to the first surface 14 of the battery cell 10 in the cover 120 is the second stepped portion 123b, and a portion positioned further inward than the second stepped portion 123b is the first stepped portion 123a, the sectional area of the side portion on a surface (x-y plane) parallel to the first surface 14 of the battery cell 10 may be formed to be gradually decreased in the direction distal from the first surface 14.

The pressing member 130 may be provided at a lower portion of the cover 120. The pressing member 130 is mounted on the insulating member 120, and may include a second opening 132 corresponding to the first opening 142. The pressing member 130 may include a pressing portion 131 provided on the insulating member 130, and a support portion 133 protruded toward the cover 120 at the outer circumferential portion of the pressing portion 131. The second opening 132 may be provided in the pressing portion 131. The support portion 133 may be provided with a connecting hole 130a formed at a position corresponding to the gas exhaust port 125 provided to the cover 120. The connecting hole 130a may be connected to the gas exhaust port 125 to form a flow path through which the gas from the battery cell 10 is exhausted. When protruding toward the accommodating portion 122 of the cover 120, the gas exhaust port 125 may be supported by the connecting hole 130a.

The pressing member 130 is mounted on the insulating member 130, and the support portion 130 may be provided to the first stepped portion 123a of the cover 120. When the pressing member 120 is accommodated by the cover 120, the first stepped portion 123a of the cover 120 may downwardly press the support portion 133 of the pressing member 130, and the pressing portion 131 connected to the support portion 133 may press the insulating member 120 toward the battery cell 10.

The insulating member 140 includes a base portion 141 mounted on the first surface 14 of the battery cell 10, and the first opening 142 provided inside the base portion 141. The first sealing portion 143 may be formed along the outer circumferential portion of the base portion 141. The pressing member 130 may be mounted in a space defined by the base portion 141 and the first sealing portion 143 of the insulating member 140. For example, the pressing portion 131 of the pressing member 130 may press the base portion 141 of the insulating member 140, and a lower portion of the support portion 133 may be contacted with the first sealing portion 143. In one embodiment, the first sealing portion 143 of the insulating member 140 guides the position of the pressing member 130, so that it is easy to align the position of the pressing member 130 and to thereby improve process efficiency.

Figure 3:
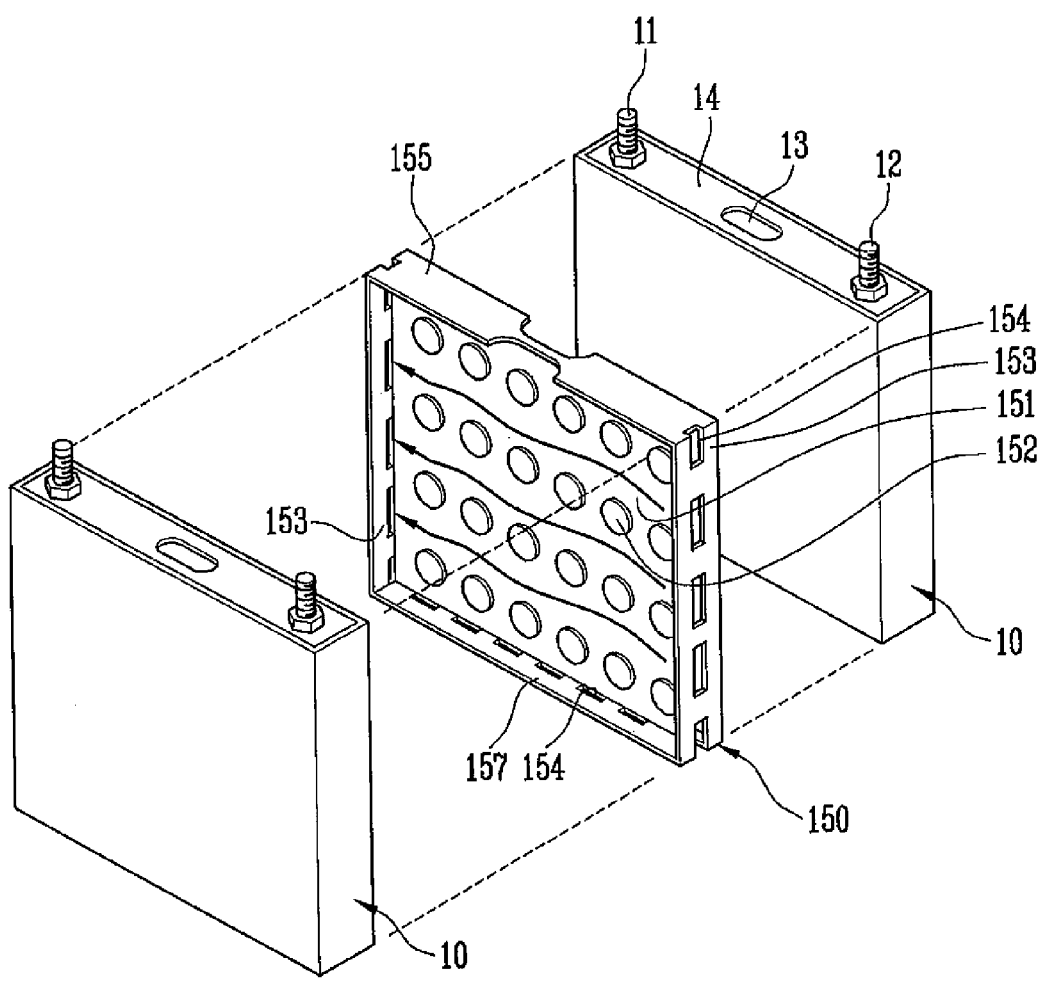
FIG. 3 is a view showing battery cells and a barrier of FIG. 2.

FIG. 3 is a view showing the battery cells and the barrier of FIG. 2.

Referring to FIG. 3, the barrier 150 may be located between the battery cells 10. The barrier 150 is provided between the battery cells 10 to allow the adjacent battery cells 10 to be spaced from each other and to provide a flow passage of a coolant heat-exchanged with the battery cell 10. The barrier 150 may include a body portion 151 configured to face a wide surface of the battery cell 10, side flange portions 153 respectively provided at either side portion of the body portion 151 to face side surfaces of the battery cell 10, and lower flange portion 157 provided at a bottom of the body portion 151 to support a bottom of the battery cell 10. An upper flange portion 155 covering the first surface 14 of the battery cell 10 may be provided at a top of the body portion 151.

Spacers 152 are provided on the body portion 151 to allow the battery cell 10 and the body portion 151 to be spaced from each other and to provide the flow passage of the coolant between the body portion 151 and the battery cell 10. One or more holes 154 may be provided in the side and lower flange portions 153 and 157 so that the coolant can be flowed in or out therethrough. A third opening 157 corresponding to the vent portion 13 is provided in the upper flange portion 155, to expose the vent portion 13 of the battery cell 10 therethrough.

Figure 4A:
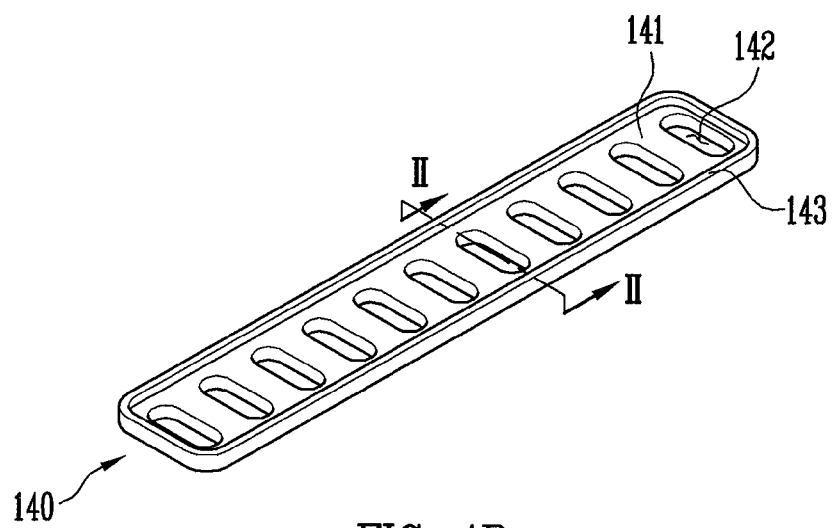
FIG. 4A is a perspective view of an insulating member of FIG. 2.
Figure 4B:
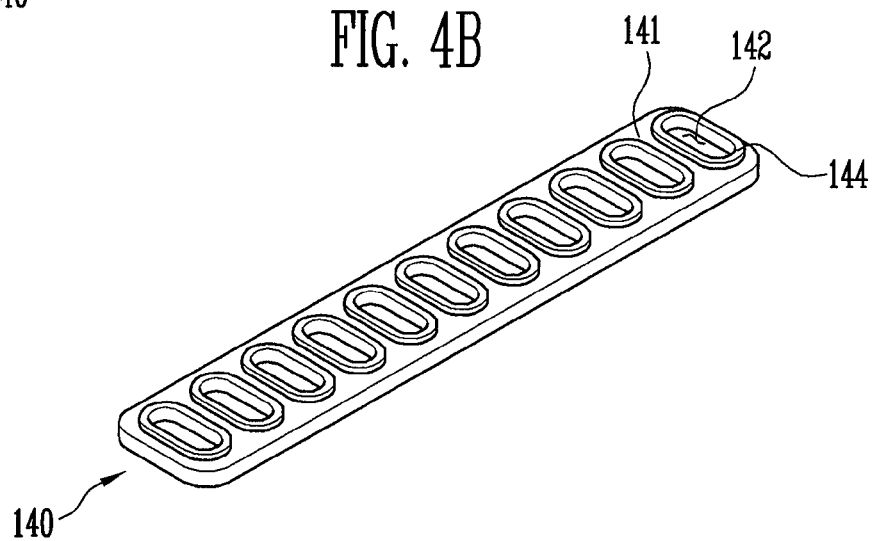
FIG. 4B is a perspective view showing a lower portion of the insulating member of FIG. 4A.
Figure 4C:
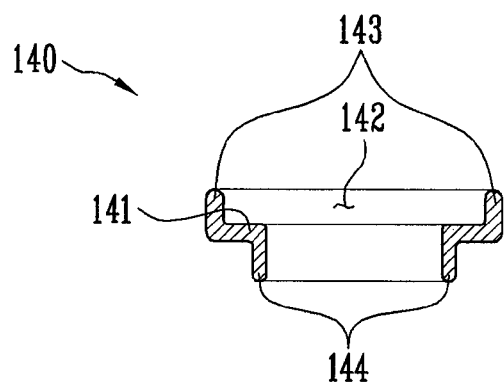
FIG. 4C is a sectional view taken along line II-II of FIG. 4A.

FIG. 4A is a perspective view of the insulating member of FIG. 2. FIG. 4B is a perspective view showing a lower portion of the insulating member of FIG. 4A. FIG. 4C is a sectional view taken along line II-II of FIG. 4A.

Referring to FIGS. 4A to 4C, the insulating member 140 according to this embodiment may include the base portion 141 having the first opening 142, and the first and second sealing portions 143 and 144. The base portion 141 is mounted on the first surface of the battery cell. In one embodiment, the base portion 141 may be mounted so that the vent portion is exposed through the first opening 142. The first sealing portion 143 may be provided at an upper surface of the base portion 141 along the outer circumferential portion of the base portion 141, and the second sealing portion 144 may be provided adjacent to the first opening 142 at a lower surface of the base portion 141. The first sealing portion 143 may be provided to be continuously extended along the outer circumferential portion of the base portion 141, and the second sealing portion 144 may be provided to surround the first opening 142. The insulating member 140 may include a plurality of first openings 142 provided to be spaced from each other. The second sealing portion 144 may be provided to individually surround each first opening 142. The first sealing portion 143 may be vertically protruded from the base portion 141, and the second sealing portion 144 may be spaced from the first sealing portion 143 to be vertically protruded from the base portion 141.

Generally, in a battery module including a plurality of battery cells, a gas generated inside the battery cell is a harmful gas, and may compromise the safety of the battery cell. Therefore, it is helpful to collect the gas in a predetermined space and to exhaust the collected gas to the outside. Accordingly, a cover, e.g., a degassing cover is provided on a vent portion of the battery cell to collect the gas exhausted from the battery cell. In one embodiment, the cover comprises plastic with rigidity or metal subjected to insulation processing. As such, using a cover alone may be unable to effectively form a gas exhaust path (i.e. gas may escape at an undesired location on the path). Therefore, a gasket, a silicon adhesive or the like may be added between the cover and the vent portion. When the adhesive is used as described above, it is difficult to confirm the presence of adhesion between the cover and the vent portion. Therefore, it may be difficult to maintain constant quality, and the process efficiency can deteriorate by a high failure rate. On the other hand, according to embodiments of the present invention, the vent portion can be effectively sealed without using any adhesive or the like, thereby improving process efficiency. Further, a new structure is applied without using any separate adhesive, so that it is possible to ensure the sealing performance of a gas flow path. Further, an adhesive and a process of attaching the adhesive can be omitted, so that it is possible to reduce production cost and to improve productivity. Further, a new insulating member is applied, so that the vent portion can be sealed in multi directions, using only one insulating member, thereby improving the reliability and safety of the battery module.

Figure 5:
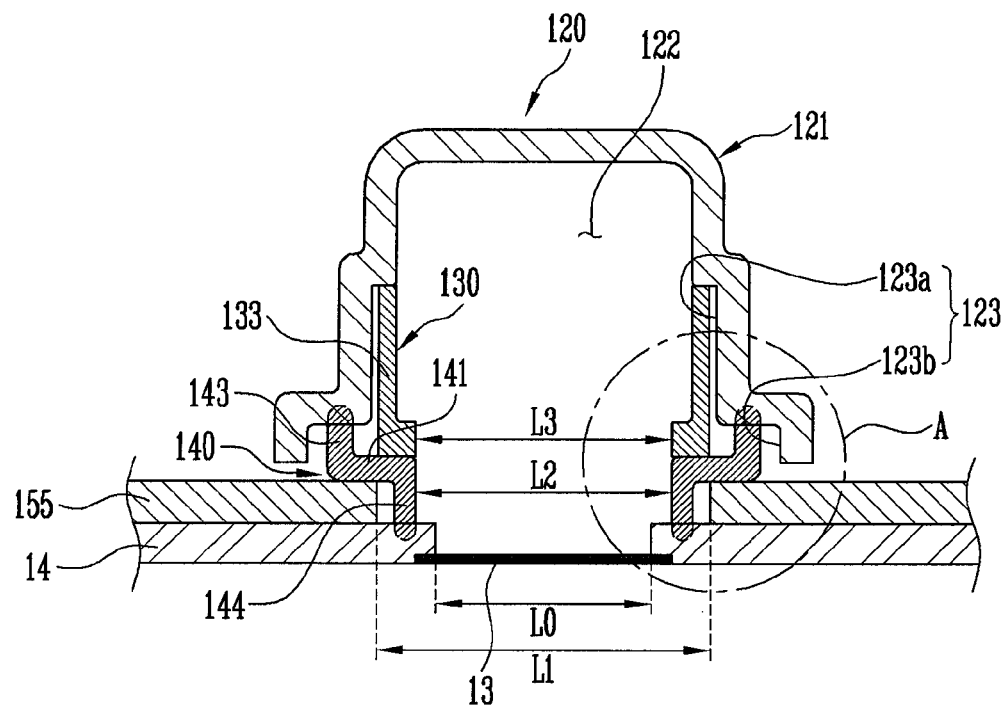
FIG. 5 is a sectional view taken along line I-I of FIG. 1.
Figure 6:
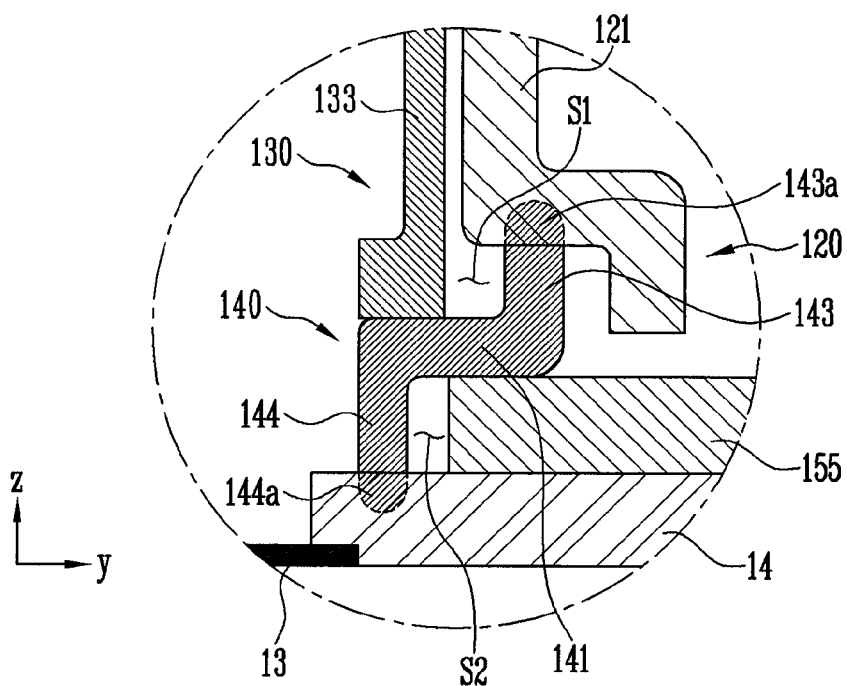
FIG. 6 is an enlarged view of portion A of FIG. 5.

FIG. 5 is a sectional view taken along line I-I of FIG. 1. FIG. 6 is an enlarged view of portion A of FIG. 5.

Referring to FIGS. 5 and 6, the upper flange portion 155 of the barrier, the insulating member 140, the pressing member 130 and the cover 130 may be sequentially provided on the first surface 14 of the battery cell 10. The vent portion 13 may be exposed by the third opening provided in the upper flange portion 155, the first opening provided in the insulating member 140 and the second opening provided in the pressing member 130.

When the vent portion 13 has a diameter L0, the diameter L1 of the third opening of the upper flange portion 155 may be formed greater than the diameter L0 of the vent portion 13. In addition, in one embodiment, the diameter L1 of the third opening of the upper flange portion 155 is formed greater than a diameter L2 of the first opening provided in the insulating member 140. Therefore, the second sealing portion 144 provided along the circumference of the first opening of the insulating member 140 may be inserted into the third opening of the upper flange portion 155 to directly contact the circumference of the vent portion 13. In other words, the upper flange portion 155 is located between the insulating member 140 and the first surface 141, but the second sealing portion 144 of the insulating member 140 may be provided to surround the vent portion 13 by passing through the third opening of the upper flange portion 155.

The pressing member 130 may be mounted on the insulating member 140 to contact the first sealing portion 143 of the insulating member 140, and the diameter L3 of the second opening provided in the pressing member 130 may be provided approximately similar to a diameter L2 of the first opening provided in the insulating member 140. Thus, the gas exhausted from the vent portion 13 is exhausted through the first opening of the insulating member 140 and the second opening of the pressing member 130 to be collected in the accommodating portion 122 of the cover 120, thereby forming a flow path.

The pressing member 130 and the insulating member 140 may be accommodated in the accommodating portion 121 provided inside the cover 120. In one embodiment, the accommodating portion 121 is surrounded by the side portion 122, and the support portion 133 of the pressing member 130 and the first sealing portion 143 of the insulating member 140 may face the side portion 122. The side portion 122 is provided to have a step difference, and may include the first and second stepped portions 123a and 123b. The first stepped portion 123a may press the support portion 133 of the pressing member 130, and the second stepped portion 123b may press the first sealing portion 143.

The insulating member 140 may be made of a material having elasticity. When the cover 120 is mounted above the battery cell 10, the first stepped portion 123a of the cover 120 presses an end 143a of the first sealing portion 143, and the end 143a of the first sealing portion 143 is compressed to be filled in a first separate space S1 between the second stepped portion 123b and the first sealing portion 143. Similarly, an end 144a of the second sealing portion 144 is also pressed, to be filled in a second separate space S2 between the first surface 14 and the upper flange portion 155.

In other words, the cover 120 presses the first sealing portion 143 (in a −z direction), and thus the first sealing portion 143 having elasticity is closely contacted with the cover 120 while being compressed (in a z direction). In addition, the second sealing portion 144 is closely contacted with the vent portion 13 while compressing the circumferential portion of the vent portion 13 (in the −z direction), so that it is possible to improve the sealing performance between the cover 120 and the vent portion 13. In the battery module according to this embodiment, the cover 120 is used without performing an additional pressing operation, so that it is possible to effectively seal the first separate space S1 between the cover 120 and the insulating member 140 and the second separate space S2 between the first surface 14 and the insulating member 140, thereby improving process efficiency.

Hereinafter, other embodiments of the present invention will be described with reference to FIGS. 7 to 10. Contents of these embodiments, except the following contents, are similar to those of the embodiment described with reference to FIGS. 1 to 4B, and therefore, their detailed descriptions will be omitted.

Figure 7:
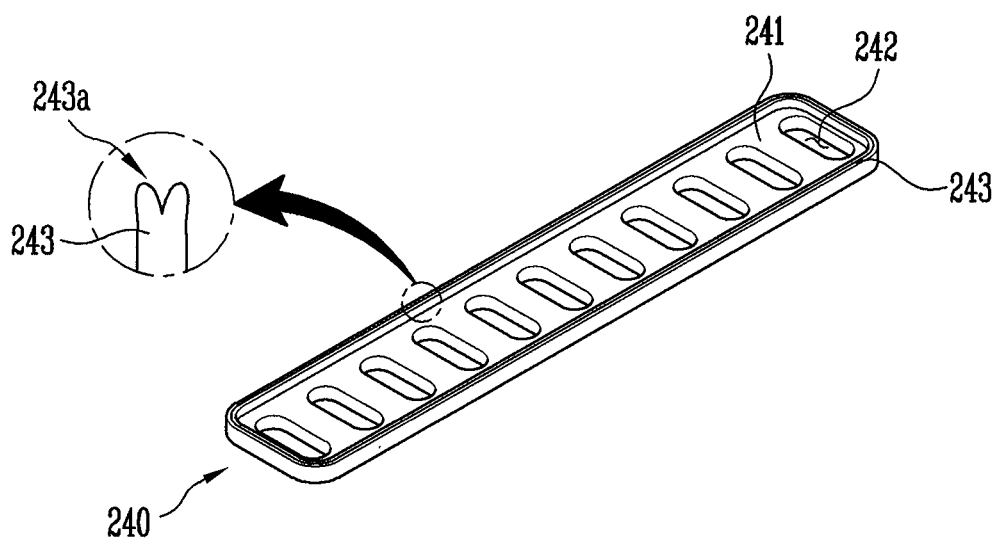
FIG. 7 is a perspective view of an insulating member in a battery module according to another embodiment of the present invention.
Figure 8:
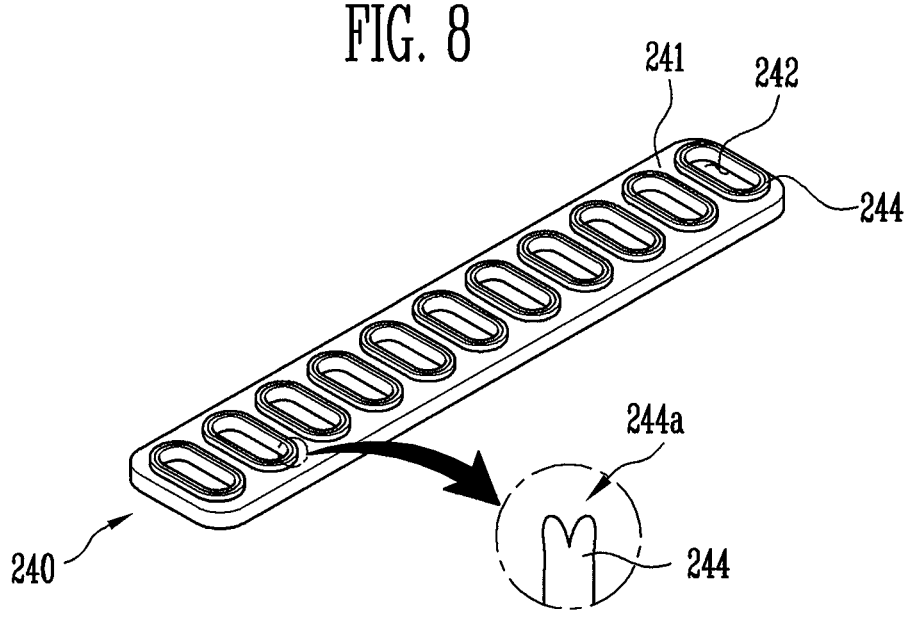
FIG. 8 is a perspective view showing a lower portion of the insulating member of FIG. 7.
Figure 9:
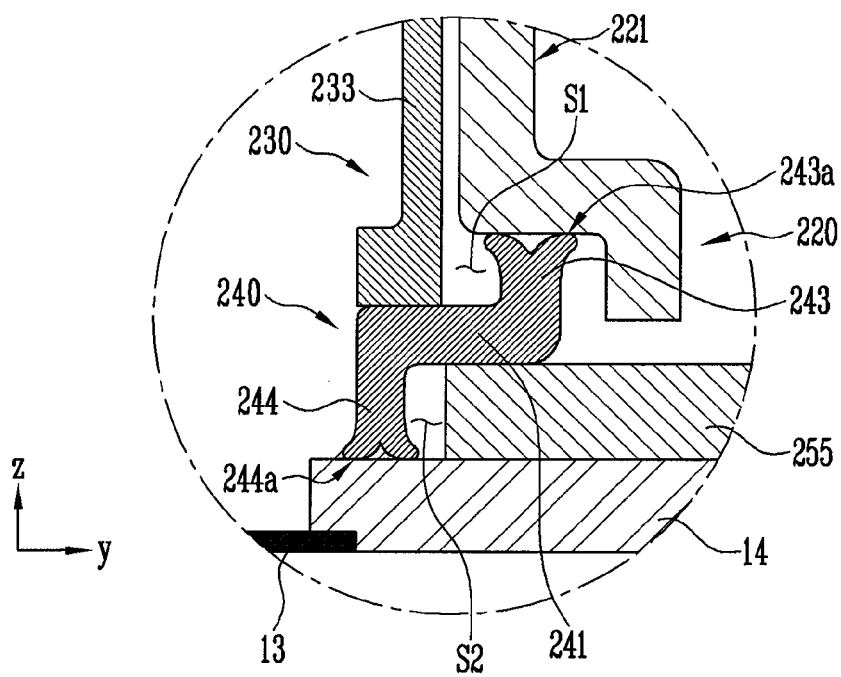
FIG. 9 is a view schematically showing the insulating member of FIG. 7 in the battery module.

FIG. 7 is a perspective view of an insulating member in a battery module according to another embodiment of the present invention. FIG. 8 is a perspective view showing a lower portion of the insulating member of FIG. 7. FIG. 9 is a view schematically showing a state in which the insulating member of FIG. 7 is disposed in the battery module.

Referring to FIGS. 7 to 9, the battery module according to this embodiment may include a barrier configured to include an upper flange portion 255 provided on the first surface 14 of the battery cell, and an insulating member 240, a pressing member 230 and a cover 220, which are sequentially provided on the upper flange portion 255. Openings corresponding to the shape of the vent portion 13 provided in the first surface 14 may be formed in the upper flange portion 255, the insulating member 240 and the pressing member 230 so that the vent portion 13 is exposed therethrough.

The insulating member 240 may include a base portion 241, a first opening 242 provided in the base portion 241, and first and second sealing portions 243 and 244. The first sealing portion 243 may be formed at the outer circumferential portion of the base portion 241 to be contacted with the cover 220, and the second sealing portion 244 may be formed along the circumference of the first opening 242 to be contacted with the vent portion 13. The first and second sealing portions 243 and 244 are provided at positions spaced from each other, to be protruded in the opposite directions to each other (in the −z and z directions) from upper and lower surfaces of the base portion 241.

An end of the first or second sealing portion 243 and 244 may be formed with a double projection 243a or 244a. For example, the first and second sealing portions 243 and 244 may be branched at the ends thereof to form the double projections 243a and 244a, respectively. Thus, when the cover 220 presses the insulating member 240, the double projection 243a or 244a can be contacted while being divided into two sides at the contacted portion thereof, thereby increasing the contact area of the insulating member 240. Accordingly, the sealing performance of the cover 220 can be further improved by friction. For example, the first sealing portion 243 is contacted with the cover 220, and the first separate space S1 between the first sealing portion 243 and the cover 220 can be effectively filled by the double projection 243a of the first sealing portion 243. In addition, the double projection 244a of the second sealing portion 244 is branched to be contacted with the circumferential portion of the vent portion 13, and thus can be effectively filled in the second separate space S2 between the first surface 14 and the upper flange portion 255. The double projection 244a increases the contact area between the second sealing portion 244 and the first surface made of a material such as metal having a smooth surface, thereby improving friction. Thus, the second sealing portion 244 can be stably fixed without being slid on the first surface 14.

Figure 10:
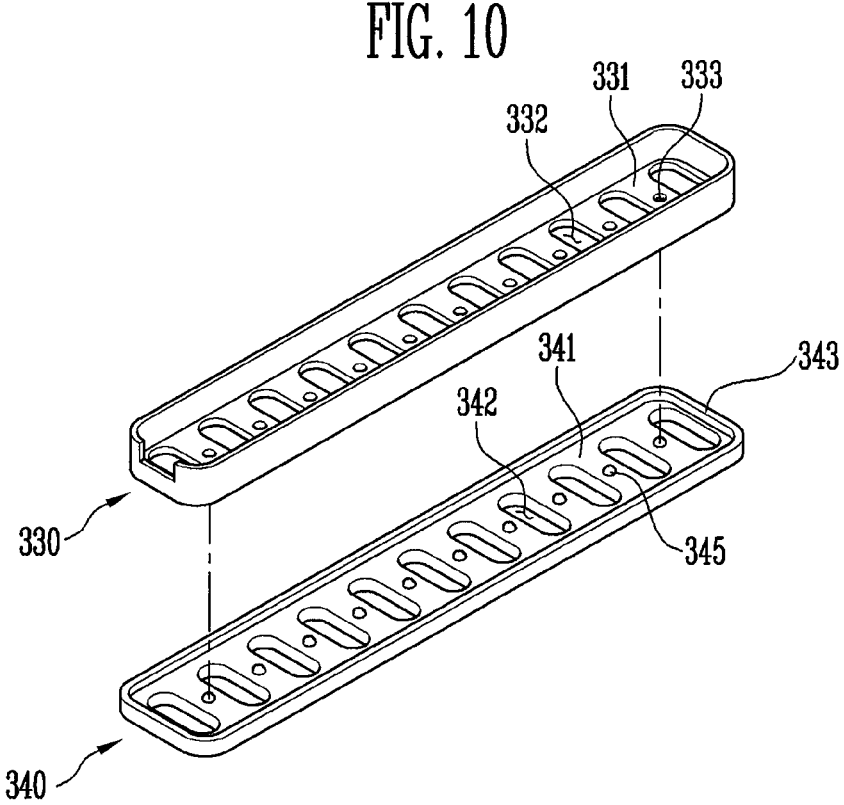
FIG. 10 is a perspective view showing an insulating member and a pressing member in a battery module according to still another embodiment of the present invention.

FIG. 10 is a perspective view showing an insulating member and a pressing member in a battery module according to still another embodiment of the present invention.

Referring to FIG. 10, the insulating member 340 according to this embodiment may include a base portion 341, first and second sealing portions 343 and 344, and a first opening 342. The pressing member 330 may include a pressing portion 331 mounted on the base portion 341, and a second opening 332 provided to correspond to the first opening 342.

First coupling portions 345 may be provided at an upper portion of the insulating member 340, and a second coupling portion 333 coupled to the first coupling portion 345 may be provided in the pressing member 330. The insulating member 340 may include a plurality of first openings 342 provided to be spaced from each other. In one embodiment, some of the first coupling portions 345 may be respectively provided between adjacent first openings 342.

For example, the first coupling portion 345 may be a projection, and the second coupling portion 333 may be an opening corresponding to the projection. The pressing member 330 is mounted on the insulating member 340, and the first and second coupling portions 345 and 333 are coupled to each other. Thus, the pressing member 330 can be stably fixed to the insulating member 340. Accordingly, when being pressed by the cover, the pressing member 330 and the insulating member 340 can be firmly fixed without any change in position thereof. Further, the position alignment of the pressing member 330 and the insulating member 340 can be easily performed by the first and second coupling portions 345 and 333, thereby improving process efficiency.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module comprising:
a plurality of battery cells each comprising a vent portion located in a cap assembly thereof, the plurality of battery cells being aligned in a first direction;
a plurality of barriers each covering at least a portion of the cap assembly so that the vent portion is exposed, the barriers being located between adjacent ones of the plurality of battery cells;
an insulating member directly contacting the cap assembly to provide electrical insulation, the insulating member having a plurality of first openings each corresponding to a respective one of the vent portions;
a cover on the insulating member on the cap assembly and covering the vent portions and the insulating member; and
a pressing member located between the insulating member and the cover,
wherein the insulating member includes a first sealing portion protruding toward the cover and a second sealing portion protruding toward and directly contacting the cap assembly.

2. The battery module of claim 1, wherein the insulating member comprises a base portion mounted on the cap assembly, and wherein each of the first openings are provided on the base portion and expose a respective vent portion therethrough, and
wherein the first sealing portion is provided along an outer circumferential portion of the base portion on an upper surface of the base portion, and wherein the second sealing portion is provided adjacent to the first opening on a lower surface of the base portion.

3. The battery module of claim 2, wherein the first sealing portion continuously extends along an outer circumferential portion of the insulating member, and wherein the second sealing portion surrounds the first opening.

4. The battery module of claim 2, wherein the first sealing portion is vertically protruded from the base portion, and wherein the second sealing portion is spaced from the first sealing portion and vertically protruded from the base portion.

5. The battery module of claim 1, wherein the pressing member is mounted on the insulating member and has a plurality of openings each corresponding to a respective one of the first openings.

6. The battery module of claim 5, wherein the pressing member comprises a pressing portion including a second opening, the pressing portion contacting the insulating member, and a support portion provided at an outer circumferential portion of the pressing portion and protruding towards the cover.

7. The battery module of claim 5, wherein the pressing member is mounted on the insulating member and contacts the first sealing portion of the insulating member.

8. The battery module of claim 1, wherein the cover includes an accommodating portion accommodating the insulating member and the pressing member therein, and a side portion surrounding the accommodating portion.

9. The battery module of claim 8, wherein the side portion is stepped in a direction toward the cap assembly.

10. The battery module of claim 9, wherein the side portion includes first and second stepped portions provided to be stepped from each other, and wherein the sectional area of the first stepped portion in the direction parallel to the cap assembly is provided smaller than a sectional area of the second stepped portion.

11. The battery module of claim 10, wherein the first and second stepped portions are sequentially provided, and wherein the second stepped portion is adjacent to the cap assembly.

12. The battery module of claim 10, wherein the pressing member includes a pressing portion provided on the insulating member, and a support portion protruded toward the cover at an outer circumferential portion of the pressing portion, and wherein the support portion contacts the first stepped portion of the cover.

13. The battery module of claim 12, wherein the cover includes an accommodating portion accommodating the insulating member and the pressing member therein, and a side portion surrounding the accommodating portion and facing the first sealing portion of the insulating member and the support portion of the pressing member, and wherein the first stepped portion presses the support portion, and wherein the second stepped portion presses the first sealing portion.

14. The battery module of claim 1, wherein the barrier includes an upper flange portion covering the cap assembly of the battery cell, and wherein a third opening corresponding to the vent portion is provided in the upper flange portion.

15. The battery module of claim 14, wherein the second sealing portion is inserted into the third opening and contacts a circumferential portion of the vent portion.

16. The battery module of claim 1, wherein the barrier, the insulating member, the pressing member and the cover are sequentially provided on the cap assembly of the battery cell, and expose the vent portion therethrough, and wherein the first sealing portion of the insulating member contacts the cover and the second sealing portion of the insulating member contacts a circumferential portion of the vent portion.

17. The battery module of claim 16, wherein the cover presses the first sealing portion of the insulating member, and the second sealing portion is closely contacted with the vent portion while pressing the circumferential portion of the vent portion.

18. The battery module of claim 1, wherein an end of the first or second sealing portion is formed with a double projection.

19. The battery module of claim 1, wherein first coupling portions are provided at an upper portion of the insulating member, and a second coupling portion coupled to the first coupling portion is provided in the pressing member.

20. The battery module of claim 19, wherein the insulating member includes a plurality of first openings provided to be spaced from each other, and wherein at least one of the first coupling portions is located between adjacent ones of the first openings.

* * * * *